(12) United States Patent
Middelton et al.

(10) Patent No.: US 9,359,559 B2
(45) Date of Patent: Jun. 7, 2016

(54) SYSTEM AND METHOD FOR PROCESSING DIESEL FUEL FROM WASTE OIL

(71) Applicant: HD Petroleum Inc., Winnipeg (CA)

(72) Inventors: Orville Middelton, Winnipeg (CA); Todd Habicht, Winnipeg (CA); John A. Winram, Winnipeg (CA); Barney Habicht, Winnipeg (CA)

(73) Assignee: HD Petroleum Inc., Winnipeg, MB (CA)

(*) Notice: Subject to any disclaimer, the term of this patent is extended or adjusted under 35 U.S.C. 154(b) by 106 days.

(21) Appl. No.: 14/127,752

(22) PCT Filed: Oct. 3, 2012

(86) PCT No.: PCT/CA2012/000913
§ 371 (c)(1),
(2) Date: Dec. 19, 2013

(87) PCT Pub. No.: WO2013/049918
PCT Pub. Date: Apr. 11, 2013

(65) Prior Publication Data
US 2014/0202926 A1   Jul. 24, 2014

Related U.S. Application Data

(60) Provisional application No. 61/542,730, filed on Oct. 3, 2011.

(51) Int. Cl.
*C10G 33/00* (2006.01)
*C10G 25/00* (2006.01)
(Continued)

(52) U.S. Cl.
CPC  *C10G 7/006* (2013.01); *C10G 7/00* (2013.01); *C10G 7/04* (2013.01); *C10G 9/00* (2013.01); *C10G 25/00* (2013.01); *C10G 25/003* (2013.01); *C10G 31/09* (2013.01); *C10G 33/00* (2013.01); *C10G 53/08* (2013.01); *C10G 55/04* (2013.01); *C11B 3/001* (2013.01); *C11B 3/12* (2013.01); *C11B 13/00* (2013.01);
(Continued)

(58) Field of Classification Search
CPC ........ C10G 31/09; C10G 33/00; C10G 33/02; C10G 33/04; C10G 33/06; C10G 33/08; C10G 25/00; C10G 55/00; C10G 55/02; C10G 55/04; C10G 7/006; C10G 7/04
See application file for complete search history.

(56) References Cited

U.S. PATENT DOCUMENTS

| | | | | |
|---|---|---|---|---|
| 5,871,618 A | * | 2/1999 | Lee | ................. C10M 175/0033 196/46 |
| 6,468,417 B1 | * | 10/2002 | Biscardi | ................. C10G 25/00 208/28 |
| 2002/0079248 A1 | * | 6/2002 | Kresnyak | ............... C10G 33/00 208/187 |

*Primary Examiner* — Brian McCaig
(74) *Attorney, Agent, or Firm* — Adrian D. Battison; Ade & Company Inc.

(57) ABSTRACT

There is disclosed a system and method for processing diesel fuel from petroleum-based waste oil on a small scale compared to conventional methods for re-refining waste oil to a valuable product. In an embodiment, the method comprises dehydrating waste oil to remove water from the waste oil, and operating a thermal reactor to induce thermal pyrolysis of the dehydrated waste oil and convert it into a hydrocarbon vapor phase. The hydrocarbon vapor derived from pyrolysis is condensed and distilled using a distillation tower to produce diesel fuel, heavy liquid hydrocarbon, light liquid hydrocarbon and light hydrocarbon vapor. A filtering step cleans the processed diesel fuel to obtain a clean diesel fuel product.

42 Claims, 4 Drawing Sheets

(51) Int. Cl.
*C10G 31/09* (2006.01)
*C10G 7/00* (2006.01)
*C11B 3/00* (2006.01)
*C11B 3/12* (2006.01)
*C11B 13/00* (2006.01)
*C10G 53/08* (2006.01)
*C10G 55/04* (2006.01)
*C10G 7/04* (2006.01)
*C10G 9/00* (2006.01)
*C10G 33/02* (2006.01)
*C10G 33/04* (2006.01)
*C10G 33/06* (2006.01)
*C10G 33/08* (2006.01)

(52) U.S. Cl.
CPC ... *C10G 2300/1007* (2013.01); *C10G 2400/04* (2013.01); *Y02P 30/20* (2015.11); *Y02W 30/74* (2015.05)

SYSTEM AND METHOD FOR PROCESSING DIESEL FUEL FROM WASTE OIL

This application claims the benefit under 35 USC 119(e) of Provisional Application 61/542,739 filed Oct. 3, 2011, the disclosure of which is incorporated herein by reference.

FIELD OF THE INVENTION

The present invention relates generally to the field of re-refining or reprocessing petroleum-based waste products, and more particularly to a system and method for processing diesel fuel from waste oil in a micro-scale processing facility.

BACKGROUND

Historically, re-refining waste oil has been difficult to undertake economically unless conducted on a large scale. While complex large scale processing facilities for recycling waste oils and converting them to reusable products are known, due to the expense of the known technologies, large scale capital intensive process facilities are required to draw on large geographical catchment areas for waste oil feedstock. Due to feedstock, transportation, and logistics costs, which may quickly consume any economies of scale benefit, large scale processing facilities are only viable in large regional markets able to supply sufficient quantities of waste oil feedstocks within a reasonable distance. In smaller and developing markets where such large scale operations are not sustainable, it has not been possible to economically re-refine waste oils with known technology. What is needed is a way to re-refine or reprocess oil cost effectively to accommodate smaller markets both for specific industries and smaller, possibly less developed and/or isolated, population areas.

Presently, there are no economically viable technology solutions for processing waste oil in smaller markets and trading areas where re-refining capacity is insufficient or non-existent. Therefore, current practices in markets too small to support conventional re-refining facilities include burning waste oil as a dirty fuel for industrial use or space heating, or alternatively disposing of large volumes of waste oil in potentially environmentally inappropriate ways. These practices may result in a discharge of air borne pollutants, or contamination of soils and groundwater. Whichever practice is used, the resulting water, soil, and/or air pollution contains many of the harmful chemicals found in waste oil, which may expose plants, animals, and humans to their toxic effects. Therefore, in many jurisdictions around the world, most waste oil is classified as a hazardous waste material. What is needed is a solution to economically recycle these waste oils in a more environmentally friendly manner.

There are a number of existing methods/processes for converting waste oils to diesel or diesel-like fuels. For example, U.S. Pat. Nos. 5,271,808 and 5,286,349 issued to Shurtleff disclose a process and equipment design for converting waste oil to diesel. However, these processes, typical of the refining industry, operate at high pressure and high temperature in their heated reactor vessel. Such conditions during thermal pyrolysis are known to result in unwanted coke fouling making continuous, long term operation a challenge that all petroleum refineries have to continually address at significant operating and maintaining cost.

A number of approaches have been developed to attempt to overcome the coke formation issue and the resultant difficult to control operation. For example, U.S. Pat. No. 5,885,444 issued to Wansbrough et al. discloses a system where the heat for pyrolysis of the waste oil is provided by high volume circulation of the waste oil through an external heat recovery system and reactor system. In addition, a heavy fuel oil containing coke particles and potential coke precursors is continuously removed from the reactor vessel. As another example, U.S. Pat. No. 6,132,596 issued to Yu discloses a system where pyrolysis heat is added via rapid circulation of waste oil from a reactor vessel, through the tubes of a fired heater and back into the reactor under high pressure. As the reaction proceeds, coke and coke precursors build up in the reactor and on the walls of the fired heater tubes, requiring the operator to subject the process to a high temperature treatment to convert all residual material to coke or vapours. The coke then must be physically cleaned from the inside of the reactor and the fired heater tubes.

In a further example of an existing method for converting waste oil, U.S. Pat. No. 7,255,785 discloses the transient operation of pyrolysis system whereby the waste oil is heated to 300-350° C. and then subjected to very high vacuum conditions (i.e. $10^{-6}$ torr) to allow additional evaporation and cracking to occur. However, this system is more complicated to operate than traditional continuous flow processes and may result in only about 70% conversion of the feed oil.

SUMMARY

The present invention relates to a system and method for producing diesel fuel and diesel-like products from petroleum based waste oil in a micro-scale processing facility suitable for operation in any size market, but particularly in smaller markets which cannot support large-scale re-refining facilities. The design of the present system and method is intended to overcome at least some of the limitations in the prior art related to non-continuous operation, lower product yield and substantial coke formation by providing suitable designs of the pyrolysis reactor and related equipment, and operation at suitable process conditions that are most advantageous for high yield of a high quality diesel fuel product with a minimum coke production.

Thus, in an aspect, there is provided a method comprising dehydrating raw waste oil, and continuously pumping the dehydrated waste oil into a thermal reactor where hydrocarbon thermal pyrolysis occurs and where phase change occurs from liquid to vapour. The thermal reactor may be a fired kettle reactor having a suitable capacity for a micro-processing facility. The product of the thermal pyrolysis of dehydrated waste oil in its vapour phase is condensed and distilled in a distillation column to produce a liquid hydrocarbon in the diesel fuel range and to capture those products that are outside the diesel fuel range.

In an embodiment, the fired kettle reactor is operated at temperatures ranging from about 325° C. to about 425° C., and at vacuum pressures ranging from about 0 kPag to about −35 kPag, In another embodiment, the products that are heavier than diesel range hydrocarbons are re-routed back into the fired kettle reactor and the lighter than diesel range hydrocarbons are captured as liquid fuel to be used for process energy, including process heat and electrical generator fuel.

In another embodiment, the liquid diesel fuel is pumped through a clarifying clay filter system to remove unwanted particulates, chemical contaminants and odour, and to achieve a marketable diesel fuel colour.

In this respect, before explaining at least one embodiment of the invention in detail, it is to be understood that the invention is not limited in its application to the details of construction and to the arrangements of the components set forth in the following description or the examples provided therein, or illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

The present invention will be better understood and objects of the invention will become apparent when consideration is given to the following detailed description thereof. Such description makes reference to the annexed drawings wherein.

In the drawings, embodiments of the invention are illustrated by way of example. It is to be expressly understood that the description and drawings are only for the purpose of illustration and as an aid to understanding, and are not intended as a definition of the limits of the invention.

DETAILED DESCRIPTION

As noted above, the present invention relates to a system and method for processing diesel from waste oil in a micro-scale processing facility suitable for set-up and operation in virtually any market. In the present disclosure, "micro-scale" refers to a processing facility having a capacity to process anywhere between about 160 L to about 3,500 L of dehydrated waste oil per hour.

Through extensive research and development, the inventors have designed a system and method for producing high quality diesel fuel at a micro-scale, using a system that is transportable and easily set up in virtually any size of market which was heretofore uneconomical for processing waste oils. Illustrative embodiments are now described by way of example.

Waste Oil Receiving

In an illustrative embodiment, a waste oil receiving facility is located at the waste oil processing plant to provide feedstock to the system. Waste oil may be sourced from a defined local region, preferably within a defined maximum distance from the processing site or within a given geographic region in order to reasonably control transportation costs. In accordance with environmental regulations, all necessary precautions should be taken to prevent any spillage during offload of waste oil into feedstock tanks located at the waste oil receiving facility. Suitable spill kit units should be available on site in order to initiate proper clean up procedures in the event of a spill.

Waste oil feedstock suppliers should preferably be pre-screened and required to provide waste oil samples prior to delivery for quality control testing for contaminants (e.g. PCBs). Feedstock suppliers should also be required to continually provide samples of their waste oils in order to test the samples against minimum standards for the feedstock. A plant supervisor or designated inspector should be satisfied that the quality of the waste oil feedstock meets or exceeds minimum standards before the waste oil may be pumped into the waste oil feedstock tank. As an illustrative example, in an embodiment, the standards may identify a maximum water content of anywhere between about 10% to about 50%. In another embodiment, the minimum standards may also specify that the waste oil cannot have PCB contamination.

As an illustrative example only, the waste oil capacity of feedstock tanks may be in the range of approximately 10 $m^3$ to 90 $m^3$ (10,000 L to 90,000 L), with multiple storage tanks potentially holding hundreds of thousands of liters of feedstock for processing. It is expected that the preferred embodiment can produce approximately 1 $m^3$ (1,000 L) of finished diesel product per hour, and more if scaled appropriately.

Overview of System and Method

Figure 1:
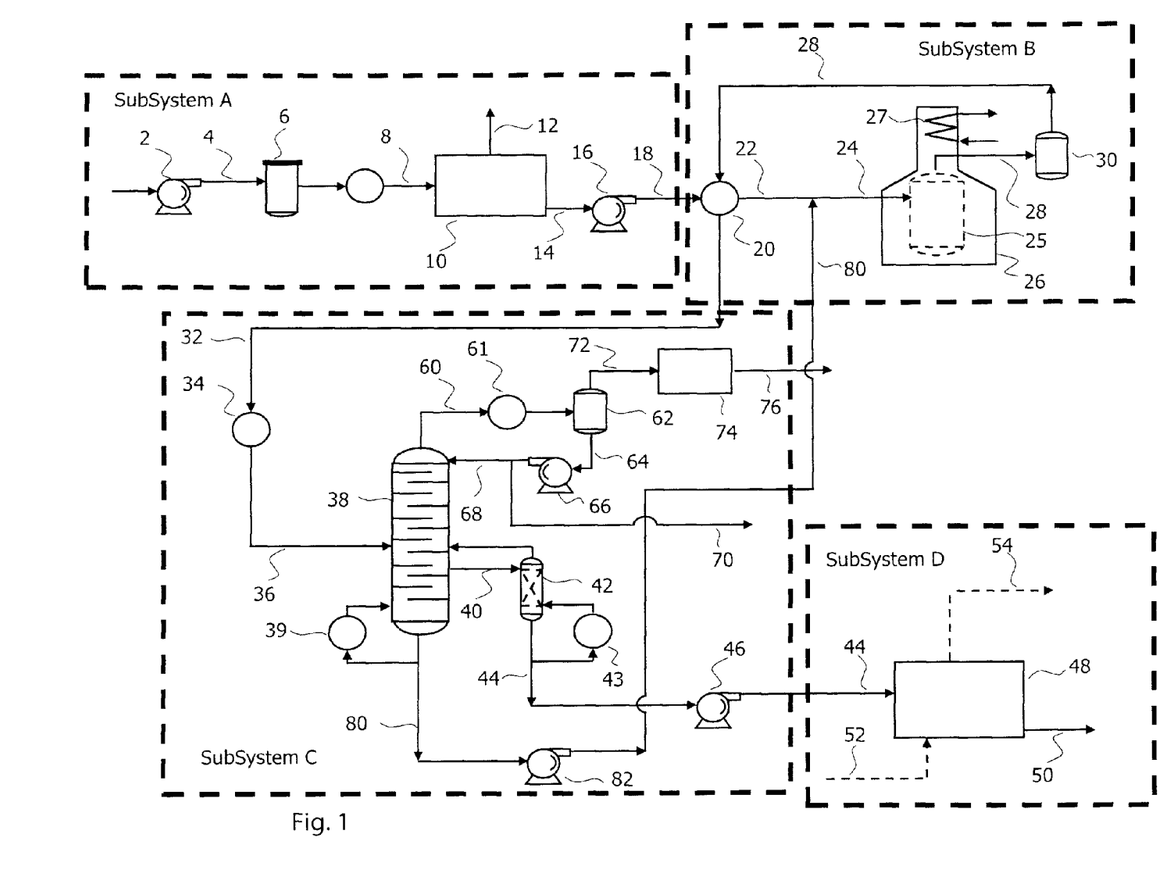
FIG. 1 shows an illustrative system and process flow for processing diesel from waste oil in accordance with a preferred embodiment.

FIG. 1 shows an illustrative overview of a system and method for processing diesel from waste oil in accordance with a preferred embodiment. As shown in this illustrative overview, the system generally comprises four subsystems, including: (i) a dehydration subsystem (Subsystem A); (ii) a thermal reactor subsystem (Subsystem B); (iii) a distillation subsystem (Subsystem C); and (iv) a filtration subsystem (Subsystem D).

As shown, Subsystem A is an illustrative dehydration subsystem in which waste oil feed transfer pump 2 continuously brings waste oil feedstock in process stream 4, that may contain a range from about 0% to about 50% free water and/or emulsified water, through a feed filter 6 to remove any large particulates which may impede later stages of the process. As an illustrative example, feed filter 6 may have a filter size of about 20 microns to about 100 microns.

In an embodiment, stream 8 is preheated before passing into the dehydrator unit 10. Preheating with waste heat from the process is desired to increase overall thermal efficiency, but is an optional step and not necessarily an integral part of the process Dehydrator unit 10 removes free and emulsified water and light waste material from the feedstock waste oil by heating the material to temperatures ranging from 100° C. to 110° C. at nominally atmospheric pressure. It will be appreciated, however, that in addition to thermal dehydration, there are various alternative methods for dehydrating a waste oil stream including coalescence, gravity separation vacuum dehydration, centrifugal separation dehydration, adsorption dehydration, and absorption dehydration. In an embodiment, where free and emulsified water percentages are above 20%, there is significant advantage to be gained by employing mechanical de-water techniques that may include but are not limited to coalescers and/or gravity separation and/or centrifuge separation to reduce water content below 10% before other more energy intensive processes such as thermal separation are employed.

Free and emulsified water is removed from the waste oil through the dehydration process to prevent unwanted side reactions and formation of corrosive compounds later in the process, where the feedstock waste oil will be heated to higher temperatures. Water vapours and light waste material resulting from the dehydration process may be incinerated or otherwise safely disposed of after being removed via stream 12. Depending on the operating pressure of the dehydration process and the disposal location, a fan or blower may be required to transport the waste material through piping or ducting from the dehydrator to the disposal location.

In one embodiment the disposal method may include incineration in a flare, or incineration in a closed-type thermal incinerator, or incineration in a firebox of a fired heater such as fired thermal reactor shell 26, or vent to atmosphere. The advantage of disposal of the material in the vapour phase is that there will be no liquid waste vapour streams produced by the process. In another embodiment, the materials in stream 12 can also be condensed to form a liquid waste stream that can be disposed of in a number of environmentally responsible ways.

Still referring to FIG. 1, the dehydrated waste oil stream 14 is pumped out of dehydrator 10 by reactor feed pump 16 via stream 18 and into pre-heater 20 in Subsystem B. In an embodiment, pre-heater 20 serves to increase the temperature of stream 22 to a range of about 125° C. to about 350° C.—with a preferred range from about 250° C. to about 350° C. and a more preferred range of about 300° C. to about 350° C.—to prepare the waste oil for thermal cracking (thermal pyrolysis) in thermal reactor 26 of Subsystem B. In an embodiment, the heat added in pre-heater 20 is provided by cooling thermal reactor pot effluent vapour stream 28 in a shell and tube heat exchanger. The use of heat from hot process stream 28 serves to increase the overall thermal efficiency and hence economic viability of the process.

In another embodiment, due to the relatively small scale of the process, pre-heater 20 could be designed as a double-pipe heat exchanger, a multi-tube double-pipe heat exchanger or a plate-and-frame heat exchanger. In still another embodiment, heat for pre-heater 20 could be provided by an appropriate heat medium or pre-heater 20 could be operated without any source of heat resulting in the entire heat load being placed on the fired thermal reactor shell 26.

In an embodiment, the thermal reactor is a fired kettle reactor consisting of the thermal reactor kettle 25 and the fired thermal reactor shell 26. The thermal reactor is designed to induce thermal pyrolysis in the dehydrated waste oil. As shown, the pre-heated, dehydrated waste oil feed stream 22 merges with the heavy hydrocarbon recycle stream 80 to form total reactor feed stream 24 which continuously feeds into thermal reactor kettle 25. Fired thermal reactor shell 26 provides the heat required to induce thermal pyrolysis of stream 24.

In an embodiment, thermal reactor kettle 25 is a cylindrical vessel with standard dished heads that may operate with a volume of liquid hydrocarbon (i.e. dehydrated waste oil from Subsystem A) ranging from about 1.5 m$^3$ to about 5.0 m$^3$ (about 1500 L to 5000 L), with a preferred range from about 2 m$^3$ to about 4.0 m$^3$ (about 2000 L to 4000 L) and a more preferred range of about 2.5 m$^3$ to about 3.5 m$^3$ (about 2500 L to 3500 L).

In an embodiment, thermal reactor shell 26 is a vertical cylindrical fired heater with one bottom mounted burner fuelled by a naphtha range light liquid process fuel and controlled either manually or, in conjunction with the fuel supply system, by a burner management system. In another embodiment, thermal reactor shell 26 can be of a cabin or box type fired heater. In another embodiment, thermal reactor shell 26 can have a plurality of floor and/or wall mounted burners. In another embodiment the burner or burners are fuelled by natural gas and/or propane, and/or fuel oil and/or other diesel-like fuel.

In an embodiment, thermal reactor kettle 25 operates in sub-atmosphere conditions, controlled by vacuum pump system 74, of about 0 kPag to about −49 kPag (about 0 psig to −7 psig), with a preferred range from about 0 kPag to about −35 kPag (about 0 psig to −5 psig) and a more preferred range of about −7 kPag to about −21 kPag (about −1 psig to −3 psig), heated to a range of about 325° C. to about 425° C., with a preferred range from about 375° C. to about 415° C. and a more preferred range of about 400° C. to about 410° C.

Under the reaction conditions described, the total reactor feed stream 24 has an average nominal liquid residence time in the thermal reactor kettle 25 of 0.5 hours to about 3 hours, with a preferred range from about 0.5 hours to about 2 hours and a more preferred range of about 0.75 hours to about 1.75 hours based on the inlet liquid feed volume. While in thermal reactor kettle the fresh waste oil feed and recycled heavy hydrocarbons undergo mild cracking reactions that reduce the size of the hydrocarbon molecules so that most of the resulting molecules have a boiling point in the diesel fuel range or lighter. Once the feed molecules have been cracked into the lighter molecules, the lighter molecules vaporize quickly and leave the reactor. The continuous addition of feed ensures that a constant level is maintained within the thermal reactor kettle. The mild operating conditions of temperature and pressure help ensure high selectivity to desired products.

In addition to the high selectivity, the mild conditions and relatively low heat flux rate from fired thermal reactor shell 26 into the thermal kettle reactor 25 ensure that the bulk process temperature as well as the kettle wall temperature remain low enough to minimize coke formation without having to withdraw any sludge and/or heavy liquid and/or liquid/solid streams from the reactor to facilitate long term (1-12 months depending on feedstock quality and operating conditions) continuous operation. The small amounts of coke that do form on the inside of the thermal reactor kettle walls can easily be removed by mechanical means such as physical scraping and/or sand blasting and/or water blasting after the reactor is drained, cooled and purged. All internal surfaces of thermal kettle reactor 25 are easily accessed for cleaning in contrast to prior art designs.

In an embodiment, waste heat in the flue gases from fired thermal reactor shell 26 can be recovered to one or more fluids passing through convection section heat recovery coil(s) 27. These potential heat recovery fluids include air being pre-heated for use in the fired thermal reactor shell 26 as combustion air, and/or a circulating heat medium fluid used to heat other parts of this process and/or providing heat to users outside this process, and/or water for the production of steam for use within the process or by users outside this process, and/or a process stream requiring heating. The primary purpose of heat recovery coil(s) 27 is to increase the overall thermal efficiency of the process.

In an embodiment, after undergoing thermal pyrolysis, cracked hydrocarbons leave thermal reactor kettle 25 as a vapour via reactor effluent stream 28 and pass through liquid knock out vessel 30 to remove any liquid inadvertently contained in the thermal reactor effluent. Although inclusion of liquid in the reactor effluent vapour is a rare occurrence, knock out vessel 30 protects downstream equipment and heat transfer surfaces from being fouled by potentially tar-like liquid that may be present in any carryover liquid. Stream 28, the final resulting vapour phase, is used to transfer thermal energy to pre-heater 20, as discussed previously, and serves to increase the thermal efficiency of the process while simultaneously decreasing the utility cooling requirements for the process. The cooled reactor effluent stream 32 exits pre-heater 20. The extent of cooling of stream 32 is controlled by the extent of heat transfer to stream 22. In an embodiment, stream 32 can remain completely in the vapour phase. In another embodiment, stream 32 can be partially condensed.

The partially cooled stream 32 and flows to the fractionation column feed cooler 34 where it is further cooled to a temperature in the range of about 200° C. to about 300° C. and partially condensed. It will be appreciated that selection of an operating temperature for stream 36 at the outlet of cooler 34 is dependent on the desired heat balance and operating conditions to be employed in fractionation column 38. Selection of conditions for column 38 will depend on available heating and cooling sources and fractionation system equipment costs to arrive at an optimal solution. Upon leaving cooler 34, the partially condensed reactor effluent stream 36 feeds into fractionation column 38.

In Subsystem C, which comprises a fractionation column and associated auxiliary equipment, reactor effluent stream 36 is distilled in fractionation column 38 into a plurality of distinct hydrocarbon fractions. In this illustrative example, four different hydrocarbon fractions are produced, but it will be appreciated that this number may be increased or decreased, as may be desired. For example, if the final product specification is for a diesel like fuel that does not have a 90% distillation recovery requirement typical of ASTM specification D975, then a distinct hydrocarbon product that is heavier than the diesel cut is not necessary. Similarly, if there is no need for a distinct light liquid hydrocarbon to be used as a fuel or a separate product, only one product need be drawn from the overhead section of fractionation column 38 rather than the two products outlined in this illustrative example. If another intermediate hydrocarbon fraction such as a kerosene or jet fuel-like product is required, another product can be drawn from an intermediate location on fractionation column 38.

In an embodiment fractionation column 38 will have an internal diameter in the range of 18 inches to 36 inches and contain 20-30 ideal equilibrium stages of separation. In an embodiment where the fractionation column diameter is 24 inches or larger, cartridge or fixed distillation trays can be the mass transfer devices inside column 38 providing the separation stages. In another embodiment random or structured packing will be used as the mass transfer media inside column 38.

Within fractionation column 38 light hydrocarbon compounds that do not meet the required diesel fractionation range travel upwards and exit column 38 via column overhead stream 60. Overhead stream 60 is cooled and partially condensed in the fractionator overhead condenser 61.

The resulting two-phase mixture is separated in overhead receiver drum 62. A portion of resultant overhead liquid stream 64 is diverted back to fractionation column 38 as reflux by overhead pump 66. The balance of the overhead liquid stream is collected as a process fuel stream 70. The reflux stream 68 returned to column 38 is used to regulate the amount of the hydrocarbon components in the lighter boiling point range of the diesel cut which are collected into the diesel side draw stream 40. The overhead receiver vapour stream 72 is drawn from receiver drum 62 by vacuum pump 74. The resulting stream 76 is a light hydrocarbon mixture and can be used for fuel of other purposes or can be disposed of in an appropriate manner, including, but not limited to incineration in a flare, incineration in a closed-type thermal incinerator, or incineration in the firebox of a fired heater. Vacuum pump 74 regulates the extent of the process vacuum that is drawn on fractionation column 38 and its associated equipment, on the reactor effluent system and on the thermal reactor kettle 25 itself. In an embodiment, the vacuum pump 74 will be an oil liquid ring pump to avoid a contaminated waste water stream. In another embodiment the vacuum pump 74 is a water liquid ring pump or alternately vacuum service can be provided by a steam ejector. In this latter embodiment, a contaminated waste water stream will be produced.

Heavy hydrocarbons that do not meet the required diesel boiling point range travel downward in fractionation column 38 and are diverted by fractionation bottoms pump 82 via stream 80 back to reactor feed stream 24 for reprocessing in thermal reactor kettle 25. This recycling of hydrocarbon material allows for the preservation of hydrocarbon and increases operational yields. Relative to prior art, the primary advantage of this heavy hydrocarbon recycle stream coming from the fractionation column is that only those hydrocarbon compounds that require additional thermal pyrolysis are subjected to further treatment in the reactor. In prior art there is either no recycle of heavy hydrocarbon or the entire reactor liquid effluent is recycled to the reactor, including compounds already suitable for diesel that are potentially further cracked so that they are lighter than required for diesel. In either prior art approach there is a loss in diesel product yield that the present invention overcomes.

Heat is added to the bottom of column 38 via a reboiler 39 to create upward flow of vapour in the column to ensure that diesel range components are not drawn out with the heavier hydrocarbons in stream 80. In an embodiment, a vertical thermosyphon reboiler is employed. However, it will be appreciated that alternate reboiler types including but not limited to kettle reboiler and/or a stab-in bundle built into column 38 could also provide the heat input for column 38.

In an embodiment, a liquid hydrocarbon side draw stream 40, containing compounds that meet diesel fuel higher boiling range specifications but that may contain some compounds that are lighter than the lower boiling point range specifications, is removed from an intermediate draw point on column 38. Stream 40 flows to the top of side stripper 42 for final separation that removes the compounds that are lighter than lower end of the diesel distillation point range. This separation ensures that the diesel fuel meets specifications such as the ASTM D975 flash point specification. In an embodiment, the side stripper reboiler 43 is a vertical thermosyphon reboiler. However, it will be appreciated that alternate reboiler type such as a stab-in bundle built into side stripper 42 could also provide the heat input for side stripper 42. The light, stripped hydrocarbons are returned, in the vapour phase, to column 38 and the side stripper bottoms stream 44 constitutes raw diesel fuel.

In an embodiment, thermal energy required for dehydrator 10, reboiler 39, and the reboiler for side stripper 42 can be provided by a number of different heating methods including steam, heat medium or fired heaters. In addition, cooling of fractionation column overhead stream 60, fractionation column feed cooler 34, and raw diesel stream 44 can be provided by air cooling and/or cooling water and/or by other appropriate cooling means.

In a preferred embodiment, the entire process is designed without a system to produce steam for use in the process. This type of design is less complicated to build and operate and precludes the generation of a waste water stream from the condensed process steam. All of these factors make the present invention more suitable for set-up and operation in virtually any market in any part of the world. However, it will also be appreciated that for installation in locations where a supply of process steam is available, the fractionation system described in Subsystem C can be operated effectively using stripping steam directly injected in to column 38 in place of reboiler 39 and directly injected into side stripper 42 in place of the side stripper reboiler 43. This change will also impact the design of the overhead system of the fractionation system.

Still referring to FIG. 1, in Subsystem D, filtration feed pump 46 draws raw diesel stream 44 to filtration unit 48 for the removal of particulates, contaminants, colour bodies, and odour contained in the diesel by contacting the raw diesel with an adsorbent clay material. In this embodiment, a regenerative filtration unit is used to filter the raw diesel fuel into a marketable grade of diesel fuel. Within the filtration unit, the raw diesel feed temperature is controlled in the range of about 35° C. to 100° C. The filtration portion of the filtration system consists of two or more banks of filter vessels. Each bank may consist of one or a plurality of individual filter vessels arranged in parallel operation such that the diesel fuel flows through all vessels in a particular bank simultaneously. Each bank has flow controlled by automated shutoff valves for ease of operation while limiting the number of required valves. In will be appreciated, however, that the filtration unit could also be operated with manual valves instead of automatic valves and that valves, manual or automatic, could also be installed on the inlet and outlet of each filter vessel.

In an embodiment, there is a filter bed of granulated clay contained within each filter vessel. Granulated clay is required to ensure even and well distributed flow of diesel fuel to each filter vessel without incurring excessive pressure drop. As an example, the granulated clay is fuller's earth (calcium bentonite). In another example, the clay is activated bauxite. Other typical activated bleaching clays are only available in pulverized form and hence not practical for use in the regenerable filtration system.

After the adsorptive capacity of the clay beds in a particular bank are exhausted, the flow of diesel fuel is diverted to another filter vessel bank for processing, such that the overall filtering process is continuous. The exhausted bank of filter vessels is prepared for regeneration by draining the remaining liquid diesel fuel from the vessels for re-processing. Regeneration entails introducing heated ambient air stream 52 into the filter vessels on a continuous basis until the combustible residual diesel and adsorbed contaminants on the clay particles begins to oxidize. At this point the self-sustaining "burn" phase of the regeneration begins and the burn front slowly moves through the clay bed oxidizing the residual diesel and adsorbed contaminants. The vapour phase products of this combustion process are vented and/or oxidized from the clay media/filter vessel via exhaust stream 54. Stream 54 can be sent for incineration to ensure complete destruction of all hydrocarbons and other contaminants in this stream. It is desirable to carefully control the rate of ambient air stream 52 to ensure that the regeneration burn does not overheat the clay media and damage its adsorptive capacity. After the burn front reaches the end of the filter vessel the oxidation stops. Non-heated air continues to flow until the clay media and filter vessels are sufficiently cooled that they can be brought back into diesel fuel filtration service. The regenerated bank will remain in a "ready" mode until needed back in service when another of the banks is ready for regeneration. Finished diesel product from filtration unit 48 leaves via stream 50 for collection.

Implementation Example

Figure 2:
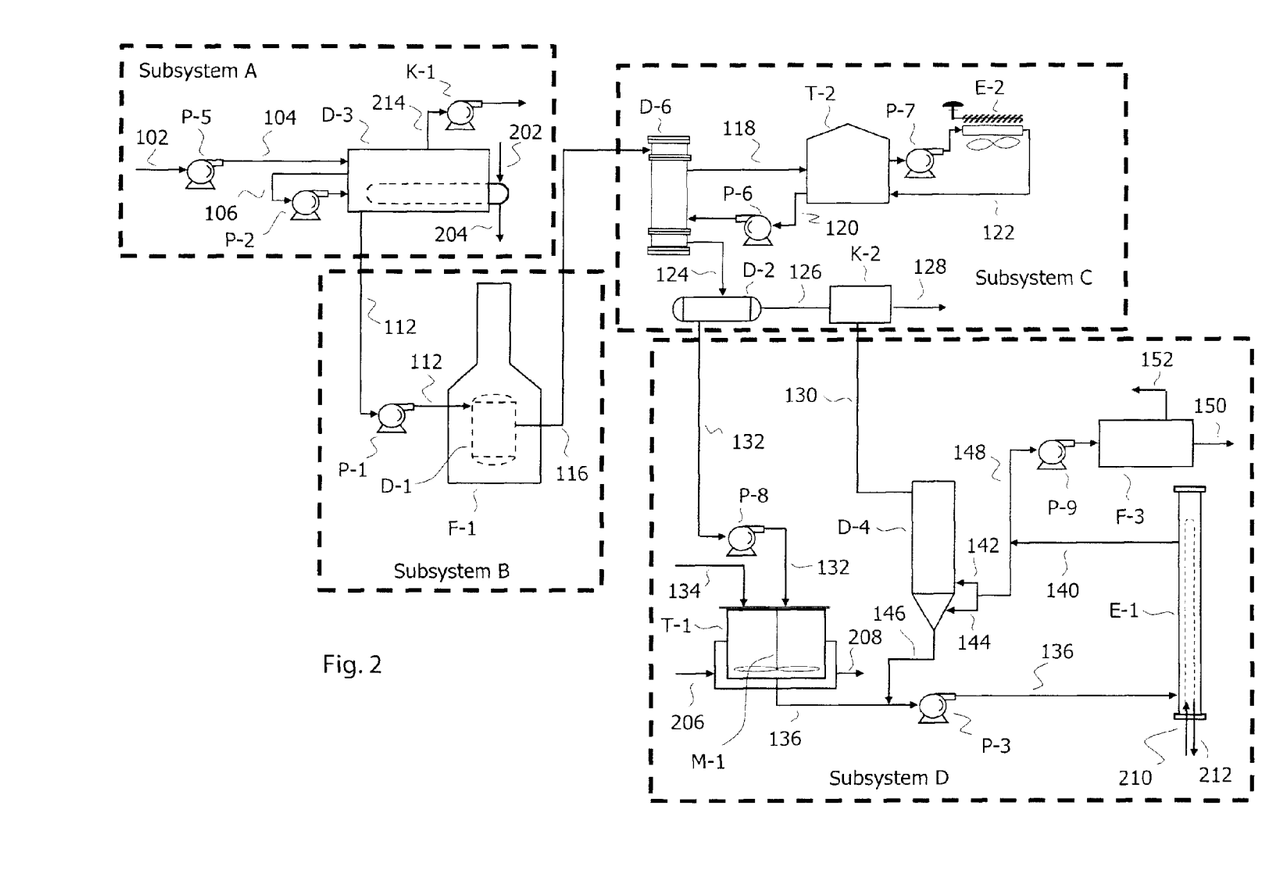
FIG. 2 shows an illustrative system and process flow for processing diesel from waste oil in accordance with another embodiment.
Figure 3:
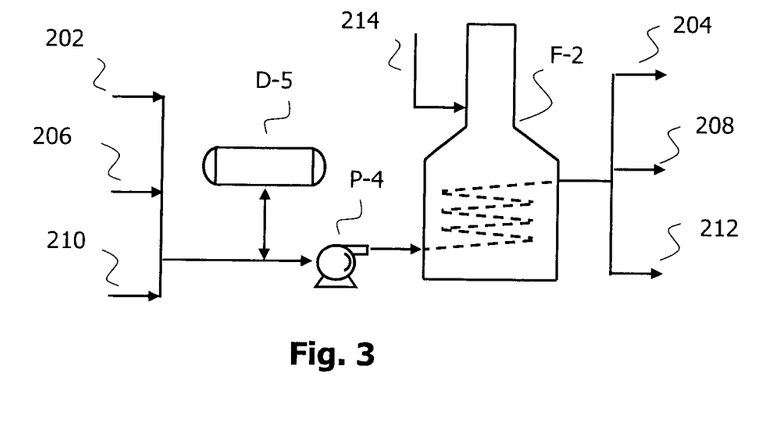
FIG. 3 shows an illustrative system and process flow for use of a heating medium in an embodiment.

FIG. 2 and FIG. 3 show a schematic block diagram of an illustrative implementation of the disclosed invention by way of example. This example is an implementation that lends itself best to a prototype or research and development application. This embodiment can be operated in a continuous, semi-batch or batch mode depending on the needs of the user. In a manner analogous to the preferred embodiment previously described, this embodiment also generally comprises four subsystems, including: (i) a dehydration subsystem (Subsystem A); (ii) a thermal reactor subsystem (Subsystem B); (iii) a condensation subsystem (Subsystem C); and (iv) a filtration subsystem (Subsystem D).

As shown in FIG. 2, Subsystem A is an illustrative dehydration subsystem in which waste oil feed transfer pump (P-5) first continuously brings waste oil from storage (stream 102) that generally contains 5-10% free water and/or emulsified water and transfers it via waste oil dehydrator feed stream 104 to dehydrator (D-3). The waste oil feedstock is heated in dehydrator (D-3) just above boiling point of the water in the stream at approximately atmospheric pressure to separate and remove water content. The preferred embodiment outlined a number of types of dehydration methods that are suitable for the service. In this example a thermal dehydration method is utilized. When operating in a batch or semi-batch mode, dehydrator (D-3) maintains operational temperatures at slightly above boiling point of $H_2O$, at approximately 105° C. (or 221° F.) for a residence time (i.e. the amount of time a particle spends in a particular system) to reach the operational temperature. Once the fluid has reached operating temperature it is ready to be drawn down and pumped to the reactor. The operating temperature is maintained by a circulating heat medium ("Dowtherm") supply stream 202 that flows through the tubes of the heating coil stubbed into the main dehydrator vessel body. Dowtherm return stream 204 leaves the heating coil to return to the Dowtherm system to be reheated. FIG. 3 depicts an embodiment of the Dowtherm system that is further described later in this document.

When filling and operating dehydrator (D-3), it is desirable to ensure that the separator level gauge reads a minimum level of 30% level to a maximum of 70% level before operating the Dowtherm loop. The dehydrator circulation pump (P-2) draws a portion of the dehydrator contents via stream 106 and returns the material to the dehydrator. The circulation causes the dehydrator contents to be well mixed promoting good heat and mass transfer to remove the water from the waste oil. P-2 should be operational at all times when the dehydrator heating coil is operating. A dehydrator blower (K-1) is shown at the top of dehydrator (D-3) that draws the evaporated water and any other light material that volatilizes at dehydrator operating conditions and transfers the vapour stream to the Dowtherm heater (F-2) firebox for incineration.

As shown in FIG. 2, Subsystem B is an illustrative thermal reactor subsystem. When the waste oil has been sufficiently dehydrated, it is fed via dehydrated waste oil stream 112 by reactor feed pump (P-1) to thermal reactor kettle (D-1). Fired thermal reactor shell (F-1) provides heat to thermal reactor kettle (D-1) to induce thermal pyrolysis of the waste oil. In this embodiment fired thermal reactor shell (F-1) is of a vertical cylindrical design with a single bottom mounted burner supplied fuelled by liquid diesel fuel. In this illustrative example, the thermal reactor kettle (D-1) is heated to a range of approximately 400° C.-410° C., and more preferably 405° C.-410° C., while under a vacuum pressure ranging from −21 to −35 kPag (−3 to −5 psig). These operating conditions cause the cracking of hydrocarbon compounds into smaller hydrocarbon compounds that quickly vaporize. If the thermal reactor kettle (D-1) operates at a higher temperature, then the resulting rapid coking becomes problematic. In addition, during operation of the fired thermal reactor shell (F-1), it is important to ensure that temperature of the thermal reactor kettle inside wall does not exceed 650° C. in order to minimize coking. Should kettle wall temperature reach this level, it is highly recommended than an emergency shut-down procedure be employed.

In normal operation the thermal kettle reactor should maintain a level that is at least half full, based on sight glass or other level measurement method to ensure acceptable performance. As such there is a need for a constant flow of dehydrated waste oil into thermal reactor kettle (D-1) from reactor feed pump (P-1) and hence the thermal reactor can only effectively be operated in a continuous manner (constant inflow and outflow of material). During start up of the thermal reactor subsystem, it is recommended that vacuum pump (K-2) be activated to depressure the entire Subsystem B and C to −3 to −5 psig before the fired thermal reactor shell (F-1) burner is lit.

As shown in FIG. 2, Subsystem C is an illustrative condensation subsystem. In this example, condenser (D-6) is operatively interconnected with thermal reactor kettle (D-1). The resulting hydrocarbon vapour stream from thermal reactor kettle (D-1) is carried via reactor effluent stream 116 to vertically mounted shell-and-tube condenser (D-6). Condenser (D-6) facilitates the partial condensation of the vapour hydrocarbon compounds into a two phase mixture by cooling against a circulating a cooling medium. The reactor effluent vapour stream 116 enters the tube side of condenser D-6 and the resulting liquid raw diesel flows by gravity to condenser surge tank (D-2). The non-condensed vapours in the condenser effluent stream 124 are drawn by vacuum through condenser surge tank (D-2) and transported via surge tank vapour stream 126 to vacuum pump K-2. The vacuum pump (K-2) provides negative pressure for the operatively interconnected thermal reactor kettle (D-1), condenser (D-6) and condenser surge tank (D-2). This single stage of separation of liquid and vapour phases from the partially condensed reactor effluent is an alternative to the more complex distillation subsystem described in the preferred embodiment. The condensing system is easier and less expensive to implement, but provides less overall control of the final diesel product quality and yield.

Condenser surge tank (D-2) acts as a buffer against fluctuations in hydrocarbon operating levels and allows any undesired solid material in the condensed reactor effluent stream, such as asphaltenes to settle to the bottom of the surge tank (D-2) for later collection. Condenser (D-6) is operated to maintain a temperature in surge tank (D-2) of no more than 165° C. Should surge tank (D-2) temperature by greater than 165° C., it is indicative of incomplete cracking of hydrocarbons in thermal reactor kettle (D-1). A line and pump (not shown) allows for liquids in the surge drum to be recycled to thermal reactor kettle (D-1) for further processing in the event of a high temperature event in surge tank (D-2).

Glycol is provided as a cooling medium from coolant tank (T-2) and is continuously circulated through the shell side of condenser (D-6) by glycol circulation pump (P-6) via glycol supply stream 120 and glycol return stream 118. In this example, the thermal energy transferred from the reactor effluent to the glycol is ultimately transferred to ambient air by glycol air cooler (E-2). The heated glycol is pumped by glycol air cooler circulation pump (P-7) to glycol air cooler (E-2). Once cooled in E-2 by ambient air passing over the glycol-containing tubes of E-2, the glycol is returned to coolant tank (T-2). It can be appreciated that the necessary operating temperature of the glycol will vary based on operating parameters such as the thermal kettle reactor (D-1) inlet flow rate, the desired cracking temperature in D-1 and the desired condensing temperature measured in surge drum (D-2).

As shown in FIG. 2, Subsystem D is an illustrative filtration subsystem for the removal of particulates, contaminants, colour bodies, and odour contained in the diesel. Raw condensed diesel stream 132 is pumped by mix tank feed pump (P-8) into mix tank (T-1) where, in this illustrative example, fresh clay (calcium bentonite) is added on a batch basis by input 134. Mix tank (T-1) serves to blend the raw diesel and clay bentonite, generally at a ratio of 4,000 liters of raw diesel to 1000 liters of clay bentonite, using mixer (M-1) located inside mix tank (T-1) for approximately 10 minutes. For the purposing of testing and research, the clay bentonite can be added manually to allow for various input levels. The resulting diesel and clay blend exits mix tank (T-1) by mixed diesel/clay stream 136 and is pumped further in the process by contactor circulation pump (P-3). For the purposes of testing and research, mix tank (T-1) is often run in batch mode so that it is filled, mixed and then completely emptied by contactor circulation pump (P-3) into the contactor loop.

The diesel/clay blend in mix tank (T-1) is kept warm (or reheated if there has been a substantial delay in transfer of material from surge tank (D-2) to mix tank (T-1) resulting in a cool raw diesel stream 132) by circulating heat transfer medium ("Dowtherm"). Heated Dowtherm is pumped from supply stream 206 to a jacket surrounding mix tank (T-1) to transfer the thermal energy of the Dowtherm to the diesel/clay blend. Cooled Dowtherm is returned to Dowtherm heater (F-2) by return stream 208. FIG. 3 depicts an embodiment of the Dowtherm system that is further described later in this document.

The mixed diesel/clay stream from mix tank (T-1) is pumped by contactor pump (P-3) to heat exchanger (E-1), where temperature of the mixed diesel/clay stream is increased to a range of 185° C. and 205° C. in preparation for filtration. Dowtherm is used to heat the mixed diesel/clay stream. Dowtherm from supply stream 210 is pumped into heating coils in heat exchanger (E-1). The small diameter and length of the contact coils within the heat exchanger allow for a high degree of thermal energy transfer between the Dowtherm and the mixed diesel/clay that is pumped past the heating coils. Cooled Dowtherm is circulated back to Dowtherm heater (F-2) for reheating. The heated mixed diesel/clay stream exits the heat exchanger by stream 140.

Heat exchanger exit stream 140 is split into two streams; one to be sent for filtration and one to be re-circulated. Splitting stream 140 allows for control of mixed diesel/clay volumes entering filtration unit (F-3), to be further described later in this illustrative example. Stream 140 diverted for re-circulation is split into streams 142 and 144 for entry into contact tower (D-4). Stream 142 constitutes approximately 70% of the volume of diverted stream 140 and enters the cylindrical section of contact tower (D-4). Stream 144 enters the inverted cone section of contact tower (D-4) at a downward angle to prevent blockages of the bottom exit stream on the contact tower. Contact tower (D-4) serves to help regulate the volume of mixed diesel/clay entering filtration unit (F-3) and maintain acceptable operating pressures in the filtration unit. Vacuum pressure is applied to the contact tower by vacuum pump (K-2) and a hydrocarbon vapour stream 130 is withdrawn through vacuum pump (K-2). The combination of vapour draw stream 126 from surge tank (D-2) and vapour stream 130 comingle in K-2 to produce a total vapour vent stream 128 that is routed for appropriate disposal or re-use as fuel. The removal of hydrocarbon vapour stream under vacuum from contact tower (D-4) at approximately 185° to 205° C. serves as a second vapour-liquid separation step on the raw diesel to remove more of the lighter hydrocarbon materials that may present issues with regard to specifications such as ASTM D975 flash point. Mixed diesel/clay exits contact tower (D-4) by contactor tower bottom stream 146, where it is re-circulated by contactor circulation pump (P-3) via stream 136.

Mixed diesel/clay stream 140 that is not diverted to the contact tower is pumped by filtration feed pump (P-9) to filtration unit (F-3). In this illustrative example, the filtration unit is a hydraulically operated filter press separates the diesel and bentonite clay into a clay containing filter cake built up on filter paper within the filter press and a clean, filtered diesel. During separation the clay carries unwanted particulates, contaminants, colour bodies, and odour from the diesel and is removed from the filtration unit as waste clay stream 152 on an intermittent basis when the pressure drop across the filter exceeds 103 kPa (15 psi). It will be appreciated that the period that the filter press can remain on-line between cleanings is dependent on the volume of diesel filtered, the ratio of clay to diesel in the mixture and the specific design of the filter press. In the illustrative example, typical operating time between filter cleanings is 24-36 hours. Filtered diesel fuel leaves the filtration unit by stream 150, where it can be collected for final testing, storage and distribution.

Shown in FIG. 3, is a heating medium circulation system for the transfer of heat energy. Dowtherm heater (F-2) provides heat to a heat transfer medium ("Dowtherm") by operating at a temperature range of 300° C.-350° C. Heated Dowtherm is pumped by Dowtherm circulation pump (P-4), at a pressure of 15 psi, to units D-3, T-1, and E-1 via streams 202, 206, and 210, respectively. After the transfer of heat energy in the various vessels, Dowtherm is re-circulated back to Dowtherm heater (F-2) along return streams 204, 208, and 212. Dowtherm surge tank (D-5) acts as a buffer against fluctuations in Dowtherm operating levels caused by thermal expansion.

Figure 4:
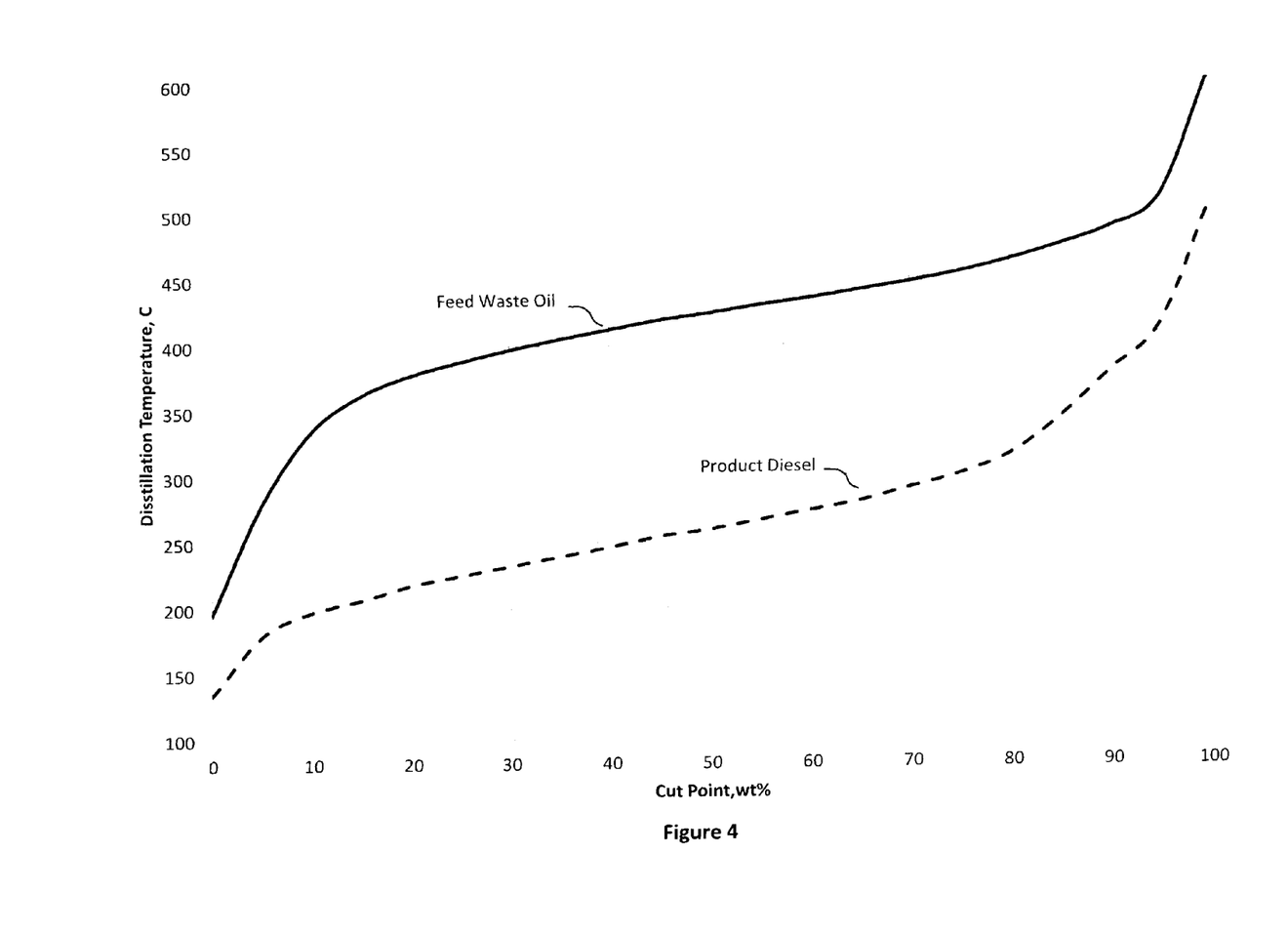
FIG. 4 shows a composition graph of feed waste oil and product diesel to illustrate the result of the described process.

The performance of the overall process as outlined in this implementation example in terms of feed waste oil composition and the final diesel product composition are shown in FIG. 4 by way of distillation cut point results. It was found that the final diesel product is a substantially lighter product encompassing a typical diesel fuel distillation range.

Thus, in an aspect, there is provided a method for re-refining petroleum-based waste oil to diesel fuel and petroleum products, comprising: (i) dehydrating waste oil to remove free and emulsified water; (ii) operating a thermal reactor to obtain a hydrocarbon vapour from thermal pyrolysis of the dehydrated waste oil; (iii) operating a hydrocarbon vapour distillation column to condense and distil one or more hydrocarbon fractions including a liquid hydrocarbon within a diesel boiling point range; and (iv) filtering the liquid hydrocarbon in the diesel boiling point range with a clay adsorbent material to remove particulates, contaminants, colour bodies, and odour.

In an embodiment, the method further comprises operating the thermal reactor with a liquid hydrocarbon volume in the range of about 1.5 m3 to about 5.0 m3 (about 1500 L to 5000 L).

In another embodiment, the method further comprises operating the thermal reactor at an operating temperature ranging from about 325° C. to about 425° C.

In another embodiment, the method further comprises operating the thermal reactor at an operating pressure ranging from about 0 kPag to about −49 kPag.

In another embodiment, the method further comprises operating the thermal reactor with an average nominal liquid residence time of about 0.5 hours to about 3.0 hours.

In another embodiment, the method further comprises pre-heating the dehydrated waste oil prior to thermal pyrolysis in the thermal reactor.

In another embodiment, the method further comprises condensing and distilling a heavy liquid hydrocarbon with a boiling point higher than the diesel boiling point range to be re-routed back into the thermal reactor for further thermal pyrolysis.

In another embodiment, the method further comprises condensing and distilling a light liquid hydrocarbon with a boiling point lower than the diesel boiling point range to be used as a process fuel or a chemical product.

In another embodiment, filtering the liquid hydrocarbon comprises passing the liquid hydrocarbon through a regenerable filter bed of granulated clay contained within one or more filter units.

In another embodiment, the granulated clay is calcium bentonite or activated bauxite.

In another embodiment, the temperature of the liquid hydrocarbon during filtering is controlled in the range of about 35° C. to about 100° C.

In another embodiment, filtering the liquid hydrocarbon comprises: contacting the liquid hydrocarbon with the clay adsorbent material to remove the particulates, contaminants, colour bodies, and odour; and filtering the liquid hydrocarbon from the adsorbent material.

In another aspect, there is provided a system for re-refining petroleum-based waste oil to diesel fuel and petroleum products, comprising: means for dehydrating waste oil to remove free and emulsified water; means for operating a thermal reactor to obtain a hydrocarbon vapour from thermal pyrolysis of the dehydrated waste oil; means for operating a hydrocarbon vapour distillation column to condense and distil one or more hydrocarbon fractions including a liquid hydrocarbon within a diesel boiling point range; and means for filtering the liquid hydrocarbon in the diesel boiling point range with a clay adsorbent material to remove particulates, contaminants, colour bodies, and odour.

In an embodiment, the system further comprises means for operating the thermal reactor with a liquid hydrocarbon volume in the range of about 1.5 m3 to about 5.0 m3 (about 1500 L to 5000 L).

In another embodiment, the system further comprises means for operating the thermal reactor at an operating temperature ranging from about 325° C. to about 425° C.

In another embodiment, the system further comprises means for operating the thermal reactor at an operating pressure ranging from about 0 kPag to about −49 kPag.

In another embodiment, the system further comprises means for operating the thermal reactor with an average nominal liquid residence time of about 0.5 hours to about 3.0 hours.

In another embodiment, the system further comprises means for pre-heating the dehydrated waste oil prior to thermal pyrolysis in the thermal reactor.

In another embodiment, the system further comprises means for condensing and distilling a heavy liquid hydrocarbon with a boiling point higher than the diesel boiling point range to be re-routed back into the thermal reactor for further thermal pyrolysis.

In another embodiment, the system further comprises means for condensing and distilling a light liquid hydrocarbon with a boiling point lower than the diesel boiling point range to be used as a process fuel or a chemical product.

In another embodiment, the system further comprises means for filtering the liquid hydrocarbon comprises a regenerable filter bed of granulated clay contained within one or more filter units.

In another embodiment, the granulated clay is calcium bentonite or activated bauxite.

In another embodiment, the temperature of the liquid hydrocarbon during filtering is controlled in the range of about 35° C. to about 100° C.

In another embodiment, the means for filtering the liquid hydrocarbon comprises: means for contacting the liquid hydrocarbon with the clay adsorbent material to remove the particulates, contaminants, colour bodies, and odour; and means for filtering the liquid hydrocarbon from the adsorbent material.

While illustrative embodiments have been described above by way of example, it will be appreciated that various changes and modifications may be made without departing from the scope of the invention, which is defined by the following claims.

The invention claimed is:

1. A method for refining petroleum based waste oil to diesel fuel and products comprising:
   (i) dehydrating waste oil to remove free and emulsified water;
   (ii) operating a vertical cylindrical reactor to obtain a hydrocarbon vapour from pyrolysis of the dehydrated waste oil;
   (iii) operating a hydrocarbon vapour distillation column to condense and distil one or more hydrocarbon fractions including a liquid hydrocarbon within a diesel boiling point range; and
   (iv) filtering the liquid hydrocarbon in the diesel boiling point range with a regenerable adsorbent material to remove particulates, contaminants, colour bodies, and odour;
   and operating the vertical cylindrical reactor at an operating vacuum pressure below atmospheric pressure ranging from about 0 kPag to about −49 kPag.

2. The method of claim 1 further comprising operating the reactor with a liquid hydrocarbon volume in the range of about 1.5 m³ to about 5.0 m³ (about 1500 L to 5000 L).

3. The method of claim 1 further comprising operating the vertical cylindrical reactor at an operating temperature ranging from about 325° C. to about 425° C.

4. The method of claim 1 wherein the vertical cylindrical reactor is operated at an operating vacuum pressure below atmospheric pressure ranging from about −7 kPag to about −21 kPag (about −1 psig to −3 psig).

5. The method of claim 1 further comprising arranging the rate of continuous in flow of feed of the waste oil relative to the volume of material in the reactor to cause operating the vertical cylindrical reactor with an average nominal liquid residence time of about 0.5 hours to about 3.0 hours.

6. The method of claim 1 further comprising pre-heating the dehydrated waste oil to a temperature in the range about 300° C. to 350° C. prior to pyrolysis in the vertical cylindrical reactor.

7. The method of claim 1 further comprising condensing and distilling in the distillation column a heavy liquid hydrocarbon with a boiling point higher than the diesel boiling point range and re-routing the heavy liquid hydrocarbon back into feed material into the vertical cylindrical reactor for further pyrolysis.

8. The method of claim 7 wherein the heavy hydrocarbons that do not meet the required diesel boiling point range travel downward in the distillation column and are diverted by a fractionation bottoms pump back to reactor feed stream for reprocessing in the vertical cylindrical reactor so that only those hydrocarbon compounds that require additional thermal pyrolysis are subjected to further treatment in the reactor.

9. The method of claim 1 further comprising condensing and distilling a light liquid hydrocarbon with a boiling point lower than the diesel boiling point range to be used as a process fuel or a chemical product.

10. The method of claim 1 wherein filtering the liquid hydrocarbon comprises passing the liquid hydrocarbon through a clarifying regenerable filter bed of granulated clay contained within one or more filter units.

11. The method of claim 10 wherein the granulated clay is calcium bentonite or activated bauxite.

12. The method of claim 10 wherein the temperature of the liquid hydrocarbon during filtering is controlled in the range of about 35° C. to about 100° C.

13. The method of claim 1 wherein filtering the liquid hydrocarbon comprises:

contacting the liquid hydrocarbon with the clay adsorbent material to remove the particulates, contaminants, colour bodies, and odour; and
filtering the liquid hydrocarbon from the adsorbent material.

14. The method of claim 1 wherein the vertical cylindrical reactor includes a reactor shell surrounding the reactor.

15. The method of claim 14 wherein the reactor shell is of a vertical cylindrical design.

16. The method of claim 14 wherein the reactor shell includes a single or multiple bottom mounted burner.

17. The method of claim 1 wherein the fresh feed input is arranged in the range 160 L to about 3,500 L.

18. The method of claim 1 wherein a continuous addition of feed ensures that a constant level of liquid is maintained within the vertical cylindrical reactor.

19. The method of claim 1 wherein the only discharge from the reactor is the hydrocarbon vapour.

20. The method of claim 1 wherein a process temperature as well as an inside wall temperature in the vertical cylindrical reactor are maintained sufficiently low to minimize coke formation without withdrawing any sludge and/or heavy liquid and/or liquid/solid streams from the bottom of the reactor.

21. The method of claim 20 wherein the temperature of an inside wall of the vertical cylindrical reactor does not exceed 650° C.

22. The method of claim 1 wherein the reactor is operated such that feed liquid is vaporised to include a diesel fuel range cut.

23. The method of claim 1 wherein the diesel fuel outlet stream from the distillation column flows to the top of a side stripper for final separation that removes the compounds that are lighter than lower temperature end of the diesel distillation boiling point range.

24. The method of claim 1 wherein the diesel fuel separation ensures that the diesel fuel meets specifications ASTM 0975 flash point specification.

25. A method for refining petroleum based waste oil to diesel fuel and products comprising:
   (i) dehydrating waste oil to remove free and emulsified water;
   (ii) operating a vertical cylindrical reactor to obtain a hydrocarbon vapour from pyrolysis of the dehydrated waste oil;
   (iii) operating a hydrocarbon vapour distillation column to condense and distil one or more hydrocarbon fractions including a liquid hydrocarbon within a diesel boiling point range; and
   (iv) filtering the liquid hydrocarbon in the diesel boiling point range with a regenerable adsorbent material to remove particulates, contaminants, colour bodies, and odour;
   and arranging the rate of continuous in flow of feed of the waste oil relative to the volume of material in the vertical cylindrical reactor to cause operating the vertical cylindrical reactor with an average nominal liquid residence time of about 0.5 hours to about 3.0 hours.

26. The method of claim 25 further comprising condensing and distilling in the distillation column a heavy liquid hydrocarbon with a boiling point higher than the diesel boiling point range and re-routing the heavy liquid hydrocarbon back into feed material into the vertical cylindrical reactor for further pyrolysis.

27. The method of claim 25 wherein the vertical cylindrical reactor includes a reactor shell surrounding the reactor.

28. The method of claim 25 wherein a continuous addition of feed ensures that a constant level of liquid is maintained within the vertical cylindrical reactor.

29. The method of claim 25 wherein the only discharge from the reactor is the hydrocarbon vapour.

30. The method of claim 25 wherein a process temperature as well as an inside wall temperature in the vertical cylindrical reactor are maintained sufficiently low to minimize coke formation without withdrawing any sludge and/or heavy liquid and/or liquid/solid streams from the bottom of the reactor.

31. A method for refining petroleum based waste oil to diesel fuel and products comprising:
(i) dehydrating waste oil to remove free and emulsified water;
(ii) operating a vertical cylindrical reactor to obtain a hydrocarbon vapour from pyrolysis of the dehydrated waste oil;
(iii) operating a hydrocarbon vapour distillation column to condense and distil one or more hydrocarbon fractions including a liquid hydrocarbon within a diesel boiling point range; and
(iv) filtering the liquid hydrocarbon in the diesel boiling point range with a regenerable adsorbent material to remove particulates, contaminants, colour bodies, and odour;
condensing and distilling in the distillation column a heavy liquid hydrocarbon with a boiling point higher than the diesel boiling point range;
and re-routing the heavy liquid hydrocarbon back into feed material into the vertical cylindrical reactor for further pyrolysis.

32. The method of claim 31 wherein the heavy hydrocarbons that do not meet the required diesel boiling point range travel downward in the distillation column and are diverted by a fractionation bottoms pump back to reactor feed stream for reprocessing in the vertical cylindrical reactor so that only those hydrocarbon compounds that require additional thermal pyrolysis are subjected to further treatment in the reactor.

33. The method of claim 31 wherein the vertical cylindrical reactor includes a reactor shell surrounding the reactor.

34. The method of claim 31 wherein a continuous addition of feed ensures that a constant level of liquid is maintained within the vertical cylindrical reactor.

35. The method of claim 31 wherein the only discharge from the reactor is the hydrocarbon vapour.

36. The method of claim 31 wherein a process temperature as well as an inside wall temperature in the vertical cylindrical reactor are maintained sufficiently low to minimize coke formation without withdrawing any sludge and/or heavy liquid and/or liquid/solid streams from the bottom of the reactor.

37. A method for refining petroleum based waste oil to diesel fuel and products comprising:
(i) dehydrating waste oil to remove free and emulsified water;
(ii) operating a vertical cylindrical reactor to obtain a hydrocarbon vapour from pyrolysis of the dehydrated waste oil;
(iii) operating a hydrocarbon vapour distillation column to condense and distil one or more hydrocarbon fractions including a liquid hydrocarbon within a diesel boiling point range; and
(iv) filtering the liquid hydrocarbon in the diesel boiling point range with a regenerable adsorbent material to remove particulates, contaminants, colour bodies, and odour;
wherein the diesel fuel outlet stream from the distillation column flows to the top of a side stripper for final separation that removes the compounds that are lighter than lower temperature end of the diesel distillation boiling point range.

38. The method of claim 37 further comprising condensing and distilling in the distillation column a heavy liquid hydrocarbon with a boiling point higher than the diesel boiling point range and re-routing the heavy liquid hydrocarbon back into feed material into the vertical cylindrical reactor for further pyrolysis.

39. The method of claim 37 wherein the vertical cylindrical reactor includes a reactor shell surrounding the reactor.

40. The method of claim 37 wherein a continuous addition of feed ensures that a constant level of liquid is maintained within the vertical cylindrical reactor.

41. The method of claim 37 wherein the only discharge from the reactor is the hydrocarbon vapour.

42. The method of claim 37 wherein a process temperature as well as an inside wall temperature in the vertical cylindrical reactor are maintained sufficiently low to minimize coke formation without withdrawing any sludge and/or heavy liquid and/or liquid/solid streams from the bottom of the reactor.

* * * * *